(12) United States Patent
Hioki et al.

(10) Patent No.: US 9,203,127 B2
(45) Date of Patent: Dec. 1, 2015

(54) BATTERY HEATER DEVICE

(71) Applicant: Panasonic Intellectual Property Management Co., Ltd., Osaka-shi, Osaka (JP)

(72) Inventors: Kazuaki Hioki, Shiga (JP); Norio Abe, Shiga (JP); Yukio Abe, Shiga (JP); Masanori Nishikawa, Shiga (JP); Koji Yoshimoto, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/398,689

(22) PCT Filed: Aug. 6, 2013

(86) PCT No.: PCT/JP2013/004750
§ 371 (c)(1),
(2) Date: Nov. 3, 2014

(87) PCT Pub. No.: WO2014/024477
PCT Pub. Date: Feb. 13, 2014

(65) Prior Publication Data
US 2015/0108113 A1  Apr. 23, 2015

(30) Foreign Application Priority Data
Aug. 7, 2012  (JP) ................. 2012-174659

(51) Int. Cl.
*H05B 1/02* (2006.01)
*H01M 10/615* (2014.01)
(Continued)

(52) U.S. Cl.
CPC ............. *H01M 10/615* (2015.04); *B60K 1/04* (2013.01); *H01M 10/5006* (2013.01);
(Continued)

(58) Field of Classification Search
CPC .......... H01M 10/615; H01M 10/5083; H01M 2201/20; B60K 2001/008; B60K 1/04; H05B 1/0236; H05B 1/238; H05B 3/0042; H05B 2203/003; H05B 2203/004; H05B 2203/005; H05B 2203/007
USPC ......... 219/203, 481, 483, 486, 497, 501, 492, 219/494
See application file for complete search history.

(56) References Cited

U.S. PATENT DOCUMENTS 5,281,792 A * 1/1994 Lee et al. ................. 219/209
5,994,669 A * 11/1999 McCall .................... 219/209
(Continued)

FOREIGN PATENT DOCUMENTS

| JP | 6-283215 | 10/1994 |
| JP | 2007-213939 | 8/2007 |
| JP | 2012-221776 | 11/2012 |

OTHER PUBLICATIONS

International Preliminary Report on Patentability and Written Opinion, Feb. 2015; PCT/JP2013/004750 (6 pages).

*Primary Examiner* — Mark Paschall
(74) *Attorney, Agent, or Firm* — Hamre, Schumann, Mueller & Larson, P.C.

(57) ABSTRACT

A battery heater device which heats a battery with a plurality of cells mounted on a vehicle comprises a first heater part which heats cells positioned at an outer side in the battery; a second heater part which heats cells positioned at an inner side in the battery; and a controller which controls power to be supplied to the first and second heater parts; wherein the controller reduces the power supplied to the second heater part at a predetermined timing after start of the power supply to the first and second heater parts, thereby improving quick-heating performance of the battery and heating the battery more uniformly with use of simple arrangement.

7 Claims, 6 Drawing Sheets

(51) Int. Cl.
*B60K 1/04* (2006.01)
*H01M 10/625* (2014.01)
*H01M 10/6571* (2014.01)
*H01M 10/617* (2014.01)
*B60K 1/00* (2006.01)

(52) U.S. Cl.
CPC ..... *H01M 10/5008* (2013.01); *H01M 10/5016* (2013.01); *H01M 10/5083* (2013.01); *H01M 10/617* (2015.04); *H01M 10/625* (2015.04); *H01M 10/6571* (2015.04); *B60K 2001/008* (2013.01); *H01M 2220/20* (2013.01)

(56) References Cited

U.S. PATENT DOCUMENTS

| | | | | |
|---|---|---|---|---|
| 6,940,047 | B2* | 9/2005 | van Kesteren et al. | 219/390 |
| 7,310,485 | B2* | 12/2007 | Peng et al. | 399/69 |
| 8,868,942 | B2* | 10/2014 | Koshimizu | 713/300 |
| 2004/0099654 | A1* | 5/2004 | Pais | 219/486 |
| 2004/0219409 | A1* | 11/2004 | Isogai | 429/26 |
| 2008/0053979 | A1* | 3/2008 | Toya et al. | 219/201 |
| 2008/0083740 | A1* | 4/2008 | Kaiserman et al. | 219/520 |

* cited by examiner

BATTERY HEATER DEVICE

TECHNICAL FIELD

The present invention relates to a battery heater device which heats a battery with a plurality of cells mounted on a vehicle.

BACKGROUND ART

A battery (battery block) including a number of cells connected with each other in a given arrangement is mounted on a vehicle. Housing the battery in a case forms a battery module. To prepare for use in cold climate, the battery module incorporates a battery heater device which heats the battery to a preset temperature.

It is desirable to heat the respective cells of the battery to a uniform temperature with use of the battery heater device. In order to heat the cells uniformly, it is proposed to adjust densities of heater wires in the battery heater device so as to change amount of heat generated by the heater wires depending on its position (for example, see Patent Document 1).

PATENT DOCUMENT

Patent Document 1: JP 2007-213939 A

SUMMARY OF INVENTION

Technical Problem

In a general battery, a cell positioned at an outer periphery (outer side) of the battery has a larger heat-dissipating area than that of a cell positioned in a central part (inner side) of the battery, thereby having larger amount of heat dissipation. Therefore, as the battery heater device heats the cells, a temperature of the cell positioned at the central part of the battery will become progressively higher than that of the cell positioned at the outer periphery of the battery.

The battery heater device shown in Patent Document 1 adjusts the densities of the heater wires so as to provide a high-heat-generating area to heat an end portion of the battery and a low-heat-generating area to heat a central part of the battery, thereby heating the cells uniformly.

Such an arrangement of Patent Document 1, however, has low amount of heat generated by the heater wires to heat cells arranged at the central part of the battery, thereby lowering amount of heat generated by the whole battery heater device. Thus, it takes a long time to increase the temperature of the battery, in particular, immediately after start of the heating, making it impossible to improve quick-heating performance of the battery.

In addition, a shape of the battery module or its cooling system becomes different depending on structure of the vehicle, differentiating where in the battery is susceptible to cooling (or heating). Thus, according to the arrangement of Patent Document 1, it is necessary to adjust the densities of the heater wires in accordance with the structure of the battery module or the vehicle, etc. This results in a very complex structure of the battery heater device.

Accordingly, it is an object of the present invention to solve the above problems and to provide a battery heater device capable of improving the quick-heating performance of the battery and heating the battery more uniformly with use of simple arrangement.

Solution to Problem

In order to achieve the above object, one aspect of the present invention is a battery heater device which heats a battery with a plurality of cells mounted on a vehicle, comprising:

a first heater part which heats cells positioned at an outer side in the battery;

a second heater part which heats cells positioned at an inner side in the battery; and a controller which controls power to be supplied to the first and second heater parts;

wherein the controller reduces the power supplied to the second heater part at a predetermined timing after start of the power supply to the first and second heater parts.

Effects of Invention

The battery heater device of the present invention can improve quick-heating performance of the battery and can heat the battery more uniformly with use of simple arrangement.

BRIEF DESCRIPTION OF THE DRAWINGS

Features and aspects thereof of the present invention will become apparent from the following description taken in conjunction with the preferred embodiments for the appended drawings.

DESCRIPTION OF EMBODIMENTS

Figure 1:
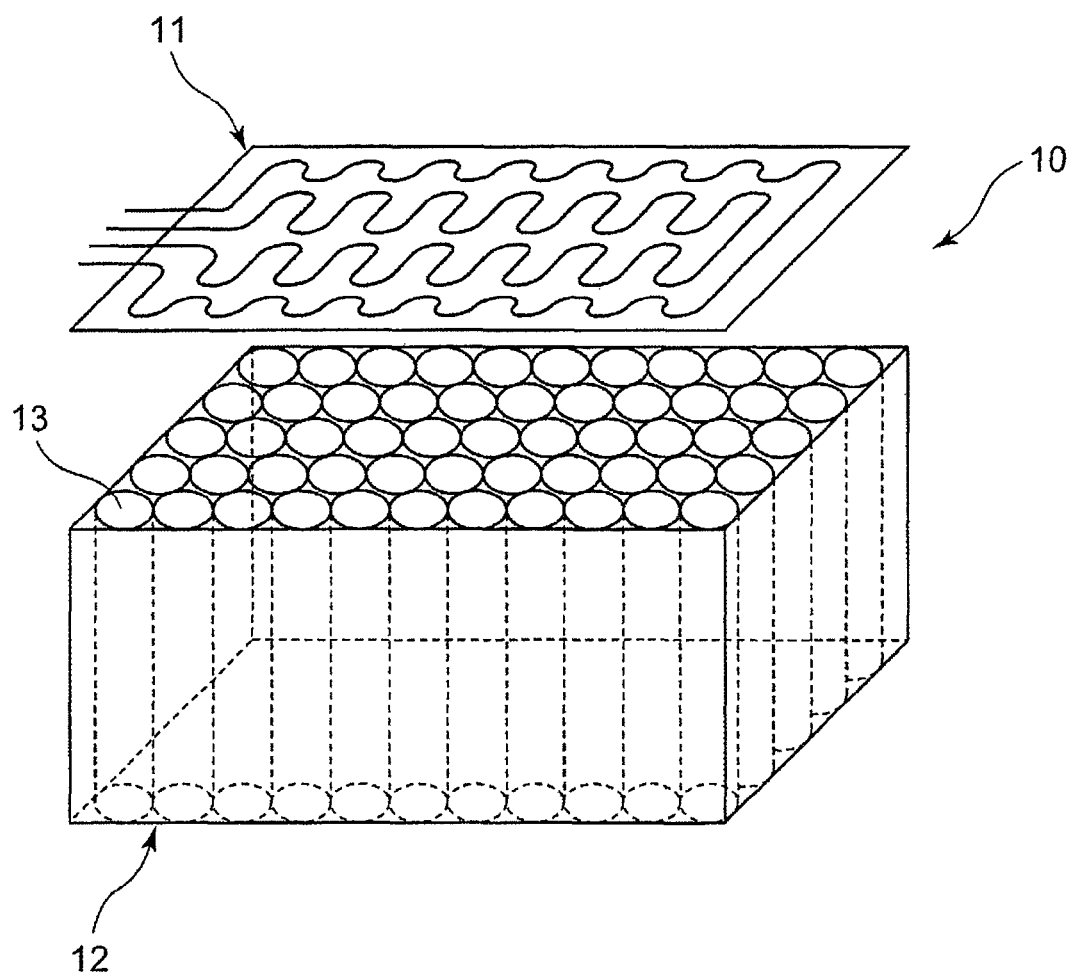
FIG. 1 is a perspective view of a battery module according to an embodiment of the present invention.

A first invention is a battery heater device which heats a battery with a plurality of cells mounted on a vehicle, comprising:

a first heater part which heats cells positioned at an outer side in the battery;

a second heater part which heats cells positioned at an inner side in the battery; and a controller which controls power to be supplied to the first and second heater parts;

wherein the controller reduces the power supplied to the second heater part at a predetermined timing after start of the power supply to the first and second heater parts.

Heating the outer cells by the first heater and heating the inner cells by the second heater can realize quick-heating of the battery. This can improve quick-heating performance of the battery. Further, reducing the power supplied to the second heater at the predetermined timing after the start of the power supply to the first and second heaters suppresses a temperature rise of the inner cells, where its temperatures are likely to rise as compared to the outer cells. This can make temperatures of the respective cells in the battery after the start of the power supply more uniform. Furthermore, utilizing power control can achieve improved quick-heating performance and more uniformity of temperatures with use of such a simple arrangement.

A second invention is the battery heater device of the first invention, wherein the controller starts the power supply to the first and second heater parts when the vehicle is switched off.

Thus, starting the power supply to the first and second heater parts when the vehicle is switched off can heat the battery when the heating is required. This can suppress waste of the power. That is, while suppressing the waste of the power, the quick-heating performance of the battery can be improved, and also the temperatures of the respective cells in the battery after the start of the power supply can be more uniform.

A third invention is the battery heater device of the first invention, further comprising a temperature sensor to detect a temperature of the battery,
wherein the controller starts the power supply to the first and second heater parts when the temperature sensor detects a temperature of the battery which is equal to or lower than a predetermined temperature.

Thus, starting the power supply to the first and second heater parts when the temperature sensor detects the temperature equal to or lower than the predetermined temperature can heat the battery when the heating is required. This can suppress waste of the power. That is, while suppressing the waste of the power, the quick-heating performance of the battery can be improved, and also the temperatures of the respective cells in the battery after the start of the power supply can be more uniform.

A fourth invention is the battery heater device of the first invention, wherein the controller stops the power supply to the first and second heater parts when the vehicle is switched on.

Thus, stopping the power supply to the first and second heater parts when the vehicle is switched on can stop the heating of the battery when the heating is not required. This can suppress the waste of the power. That is, while suppressing the waste of the power, the quick-heating performance of the battery can be improved, and also the temperatures of the respective cells in the battery after the start of the power supply can be more uniform.

A fifth invention is the battery heater device of the first invention, further comprising a temperature sensor to detect a temperature of the battery,
wherein the controller stops the power supply to the first and second heater parts when the temperature sensor detects a temperature of the battery which is equal to or higher than a predetermined temperature.

Thus, stopping the power supply to the first and second heater parts when the temperature sensor detects the temperature of the battery which is equal to or higher than the predetermined temperature can stop the heating of the battery when the heating is not required. This can suppress the waste of the power. That is, while suppressing the waste of the power, the quick-heating performance of the battery can be improved, and also the temperatures of the respective cells in the battery after the start of the power supply can be more uniform.

A sixth invention is the battery heater device of the third invention, wherein the predetermined temperature is set to a temperature under which performance of the battery is not worsened.

Thus, setting the predetermined temperature to stop the power supply to the heater at the temperature under which the battery performance is not worsened can maintain the temperature of the battery substantially under a temperature where the battery performance is not worsened. This can maintain the performance of the battery.

A seventh invention is the battery heater device of the fifth invention, wherein the predetermined temperature is set to a temperature under which the battery does not deteriorate.

Thus, setting the predetermined temperature to stop the power supply to the heater at the temperature under which the battery performance does not deteriorate can maintain the temperature of the battery substantially under a temperature where the battery does not deteriorate. This can maintain the performance of the battery.

Hereinafter, an embodiment of the present invention will be described with reference to the drawings. The embodiment does not limit the present invention.

(Embodiment)

Figure 2:
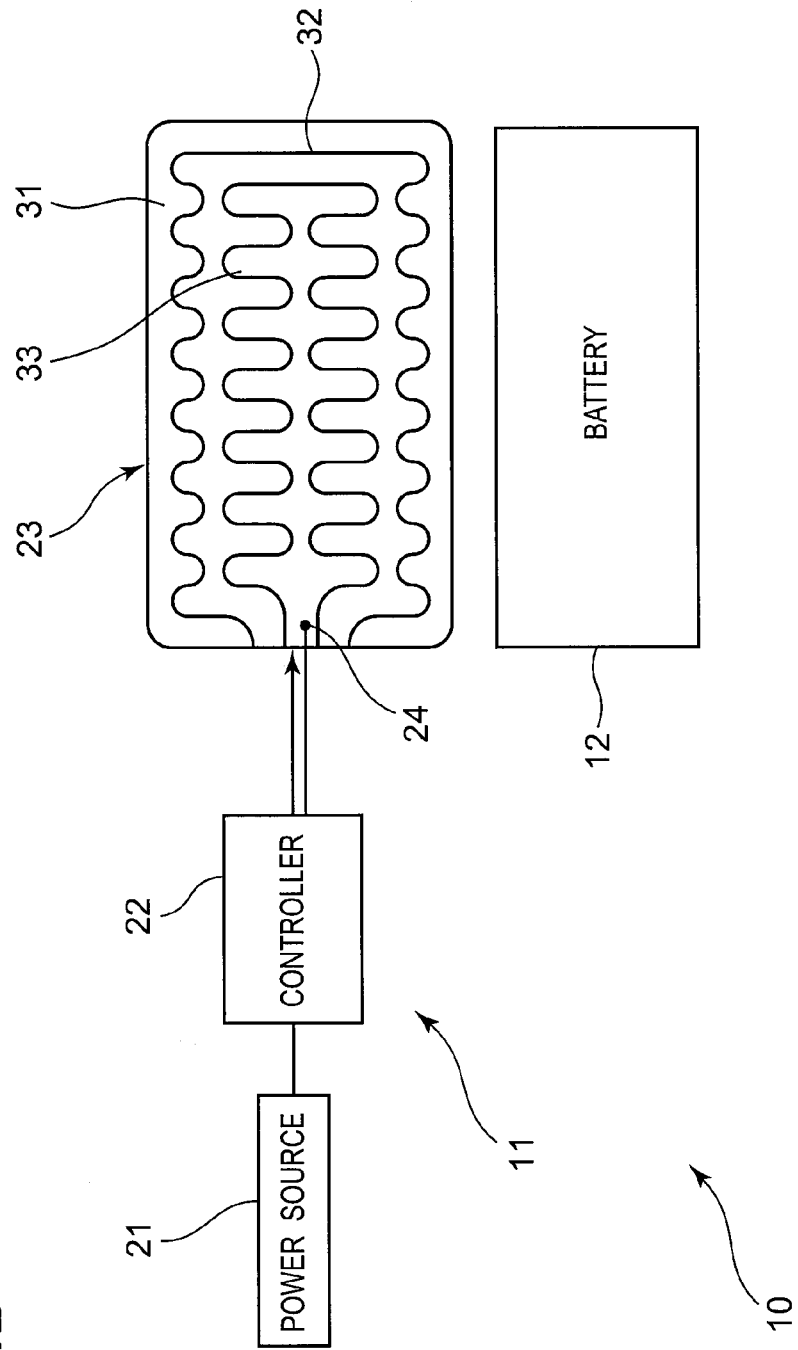
FIG. 2 is a schematic view showing an arrangement of the battery heater module according to the embodiment.
Figure 3:
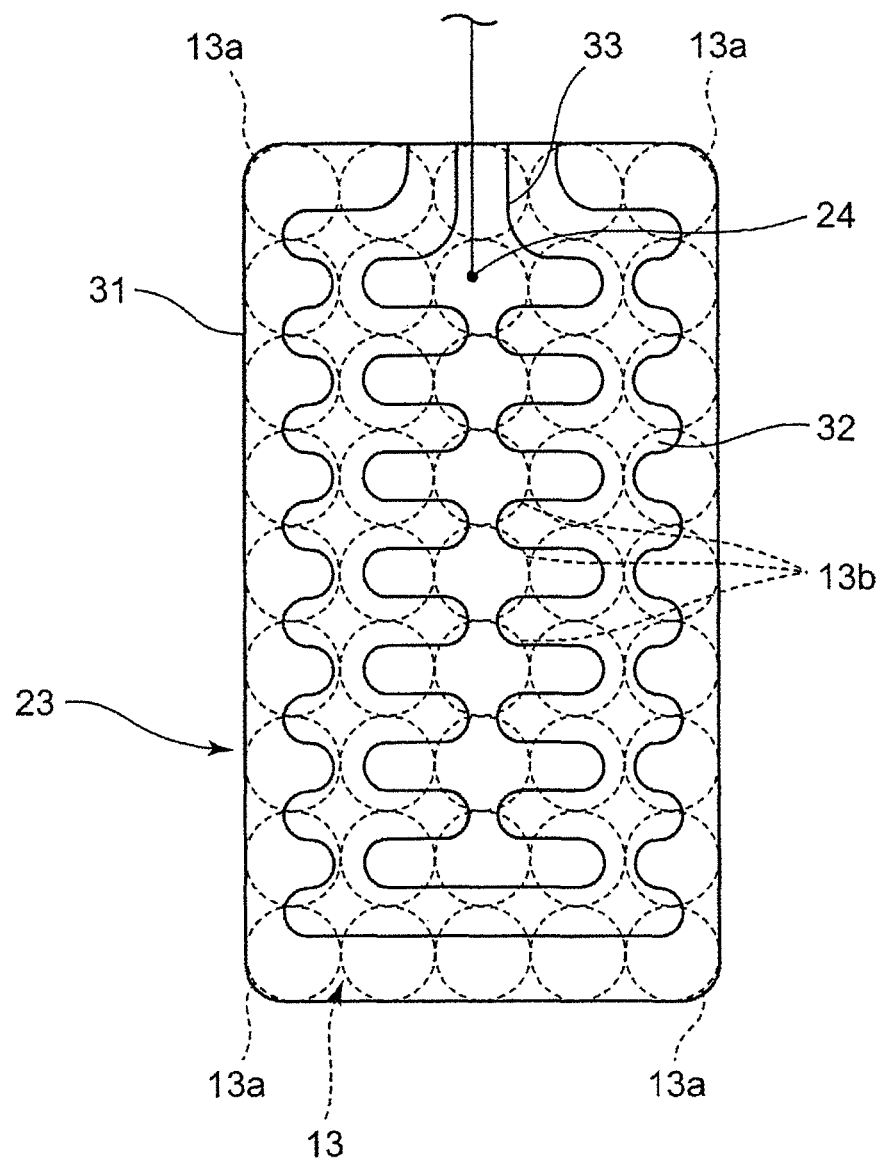
FIG. 3 is a schematic view showing wiring patterns of heater wires of a battery heater device according to the embodiment.
Figure 4:
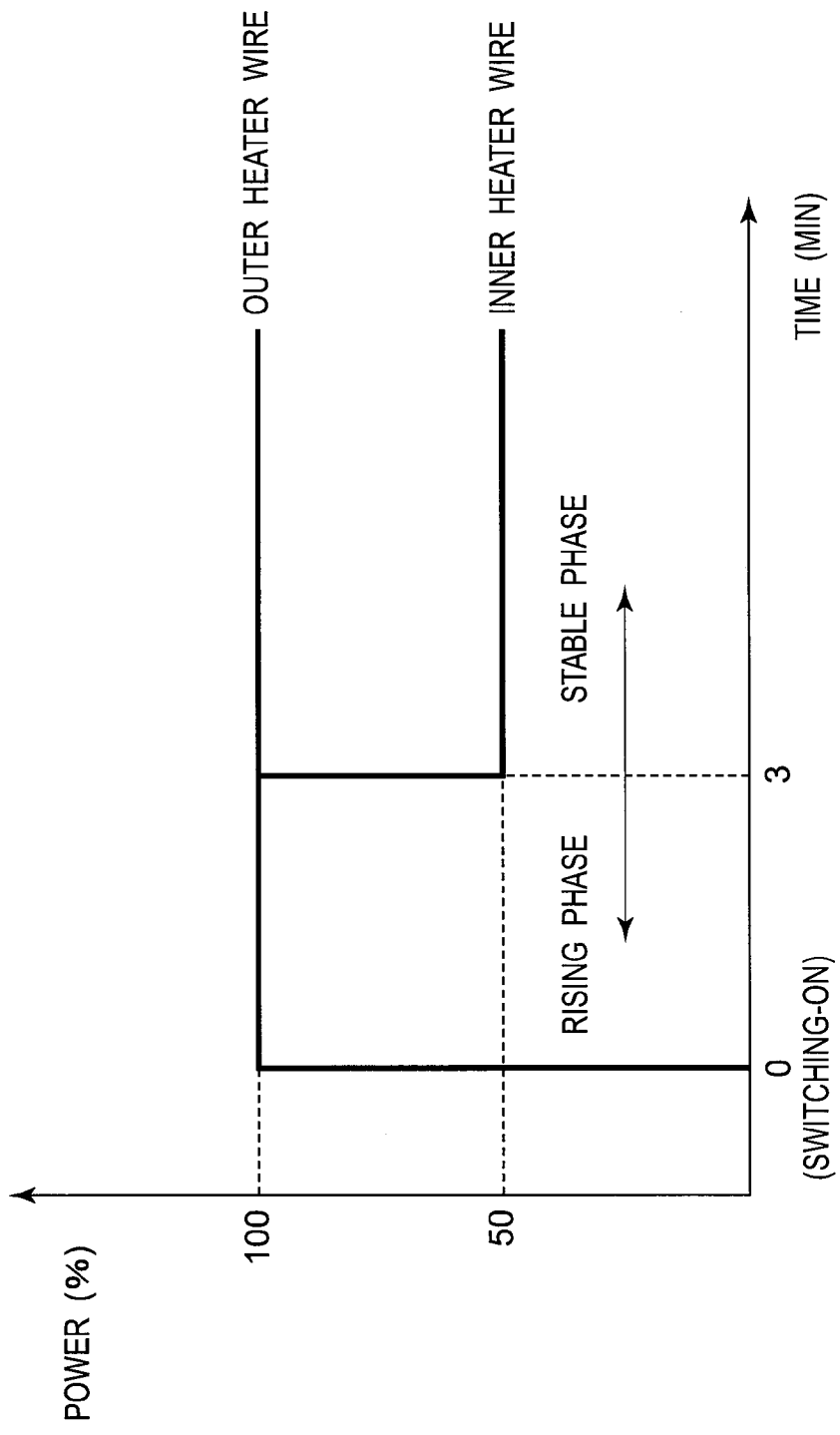
FIG. 4 is a timing chart of power control by the battery heater device according to the embodiment.

FIG. 1 is a perspective view of a battery module according to an embodiment of the present invention. FIG. 2 is a schematic view showing the battery module according to the embodiment. FIG. 3 is a schematic view showing wiring patterns of heater wires of a battery heater device of the battery module according to the embodiment. FIG. 4 is a timing chart of power control by the battery heater device of the battery module according to the embodiment.

A battery module 10 shown in FIG. 1 includes a battery (battery block) 12 and a battery heater device 11. As shown in FIG. 1, the battery 12 includes a plurality of cells 13, the cells being the same type and arranged with a plurality of rows along its radial direction. FIG. 1 shows an example where the cells have eleven rows in a horizontal direction and five rows in a depth direction. FIG. 1 shows a cylindrical shape of the respective cells 13, but not limited to this shape, its shape may be a square pole, for example. In the embodiment, the cells 13 are lithium batteries.

The battery heater device 11 of the battery module 10 heats the respective cells 13 of the battery 12. As shown in FIG. 1, the battery heater device 11 is disposed close to a top surface of the battery 12 so as to heat a top side of the battery 12. The battery heater device 11 may be disposed in contact with the top surface of the battery 12 or disposed to heat a bottom side of the battery 12. Also, the battery heater device 11 may be disposed on both top and bottom sides of the battery 12.

As shown in FIG. 2, the battery heater device 11 includes a controller 22 connected to a power source 21, a heater (heating section) 23, and a temperature sensor 24. The power source 21 provides a power supply to the controller 22. As the power source 21, a power source installed in a vehicle may be used, for example. The controller 22 controls the power to be provided from the power source 21 to the heater 23. The temperature sensor 24 detects its ambient temperature, including temperatures of the battery 12 and the heater 23, and then provides its result to the controller 22.

As shown in FIGS. 2 and 3, the heater 23 includes a base material 31, an outer heater wire 32 (first heater part 32), and an inner heater wire 33 (second heater part 33), which are disposed on the base material 31. The outer heater wire 32 is provided on an outer edge portion of the base material 31 and mainly heats cells 13a positioned at an outer side of the battery 12. The inner heater wire 33 is provided inside the outer heater wire 32 and mainly heats cells 13b positioned at a central portion (inner side) of the battery 12.

The controller 22 controls the power supplied from power source 21 to each of the outer heater wire 32 and the inner heater wire 33 in accordance with a previously-installed program.

Figure 5:
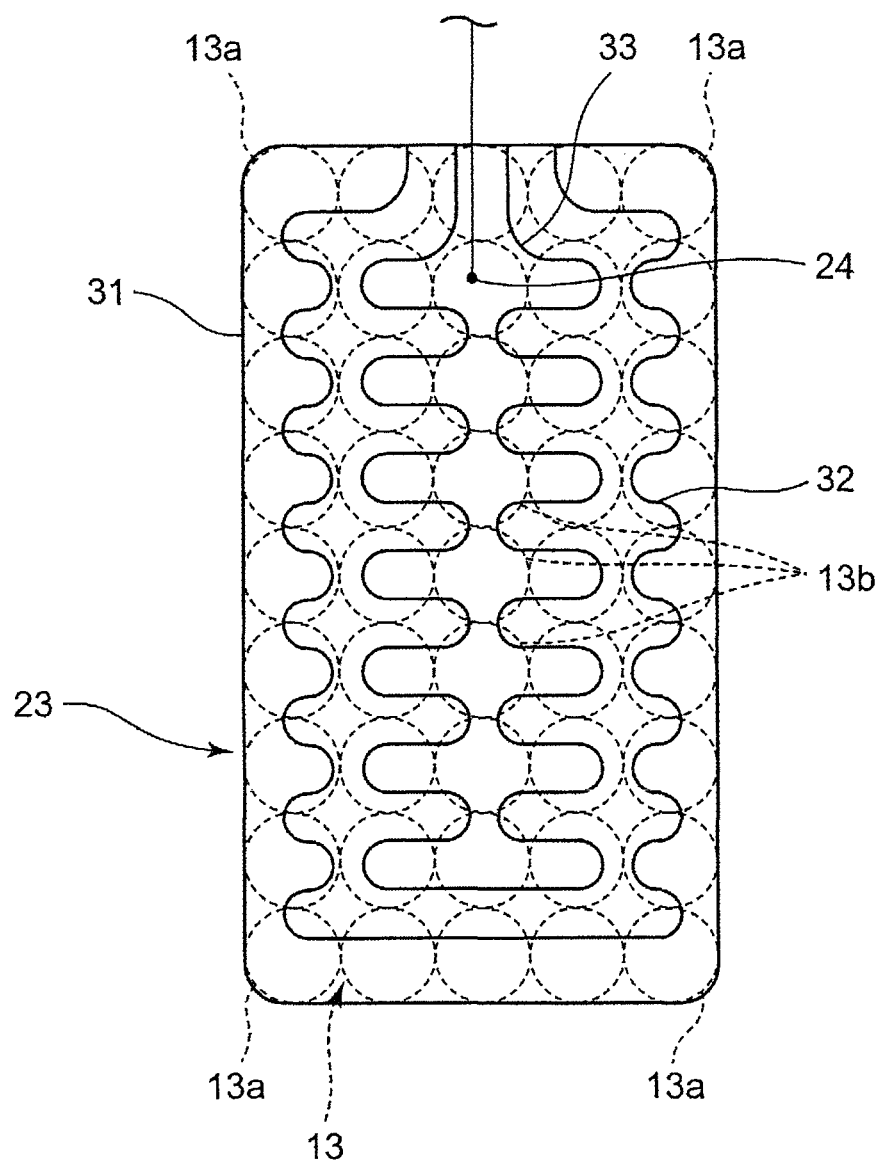
FIG. 5 is a view showing heating patterns of the heater wires at a rising phase of the battery heater device.
Figure 6:
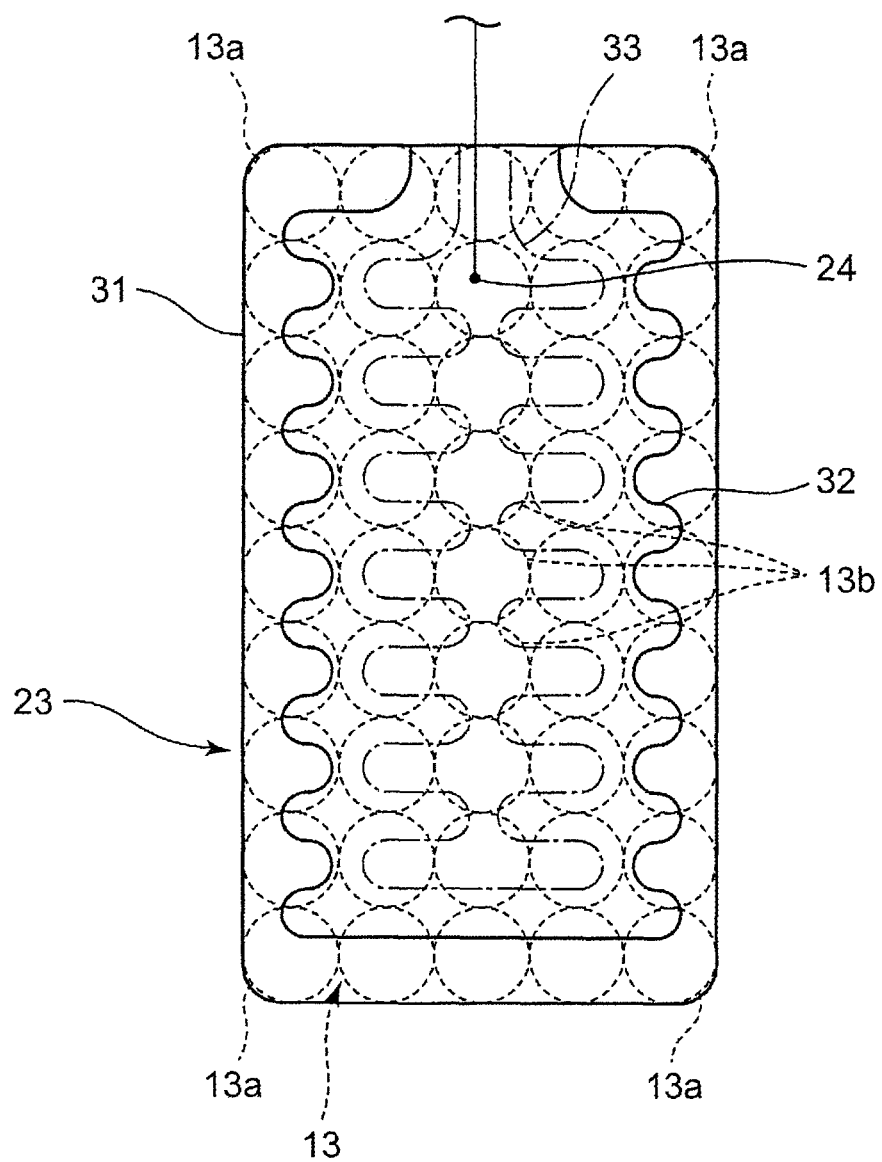
FIG. 6 is a view showing heating patterns of the heater wires in a stable state of the battery heater equipment.

Hereinafter, a specific example of the power supply to the outer heater wire 32 and the inner heater wire 33 by the controller 22 will be described with reference to FIGS. 4 to 6 for the battery heater device 11 of the battery module 10 according to the embodiment. FIG. 5 is a view showing heating patterns of the heater wires at a rising phase of the battery heater device 11. FIG. 6 is a view showing heating patterns of the heating wires at a stable state of the battery heater device 11. The rising phase of the battery heater device 11 means a period from a start of operation of the battery heater device 11 to when temperatures of the heated cells 13 become substantially constant. The stable phase of the battery heater device 11 means a period during which the temperatures of the heated cells 13 are kept substantially constant.

First, the controller 22 controls to start the power supply to the heater 23 (switched-on, 0 minute) so as to supply the power to both the outer heater wire 32 and the inner heater wire 33 as shown in FIG. 4, thereby starting a heating of the whole battery 12. The power supplied to the outer heater wire 32 and the inner heater wire 33 from the start of the power supply is referred to as 100%, respectively. This is represented by indication of each of the heater wires 32 and 33 by a solid line in FIG. 5. The power supply to both the heater wires 32 and 33 can heat the cells 13*a* positioned at the outer side in the battery 12 and the cells 13*b* positioned at the inner side in the battery 12. Heating the cells 13 of the battery 12 with use of the two heater wires 32 and 33 can improve the quick-heating performance of the battery 12.

In the Embodiment, a predetermined timing at which the controller 22 starts the power supply to the heater 23 is set when the vehicle is switched off and the temperature detected by the temperature sensor 24 becomes equal to or lower than a predetermined temperature (for example, −10 degrees). In this way, only when it is necessary to heat the battery 12, the heating is performed by supplying the power to the inner heater wire 33 and the outer heater wire 32, thereby suppressing waste of the power from the power source 21. Performance of lithium batteries used as the respective cells 13 of the Embodiment may decrease (deteriorate) sharply in low temperature. Thus, the predetermined temperature at which the controller 22 controls to start the power supply is set to a temperature under which the performance of the lithium batteries does not decrease (deteriorate) (for example, −10 degrees). This can maintain the performance of the battery 12.

The timing of starting the power supply is not limited to the above, and may be either of when the vehicle is switched off or when the temperature detected by the temperature sensor 24 becomes equal to or lower than the predetermined temperature. Such a timing can also suppress the waste of the power. When the vehicle is switched off means when an ignition switch of the vehicle is turned off, when a start switch of the vehicle is turned off, when a motor or an engine of the vehicle is stopped, or the like.

After starting the power supply to the heaters 32 and 33, the controller 22 reduces the power supplied to the inner heater wire 33 at a predetermined timing. More specifically, as shown in FIG. 4, the power supplied to the inner heater wire 33 is reduced from 100% to 50% stepwise while the power supplied to the outer heater wire 32 is maintained at 100%. This is represented by indication of the outer heater wire 32 by a solid line and the inner heater wire 33 by a dashed line as shown in FIG. 6. Reducing the power supplied to the inner heater wire 33 leads to lowering of heating value of the inner heater wire 33. As described above, the cells 13*a* positioned at the outer side in the battery 12 have larger amount of heat dissipation than that of the cells 13*b* positioned at the inner side in the battery 12, and thus the temperatures of the cells 13*b* positioned at the inner side in the battery 12 are likely to increase. Thus, reducing the power supplied to the inner heater wire 33 at the predetermined timing after the start of the power supply and thus reducing the heating value for the inner cells 13*b* can heat the respective cells 13 of the battery 12 uniformly. That is, this can inhibit uneven heating (i.e, temperature differences depending on locations) of the battery 12.

Thus, controlling the power supply to both the outer heater wire 32 to heat the outer cells 13*a* that are likely to dissipate its heat, and the inner heater wire 33 to heat the inner cells 13*b* that are not likely to dissipate its heat (that is, its temperatures are likely to be maintained) in the battery 12 can speed up the heating of the battery 12 while inhibiting the uneven heating.

In the Embodiment, the predetermined timing of reducing the power supplied to the inner heater wire 33 is set after a predetermined time (for example, 3 minutes) from the start of the power supply. For example, the predetermined time may be set to a time when it is expected that the temperatures of the respective cells 13 of the battery 12 reach a predetermined preset temperature (for example, 10 degrees).

In the Embodiment, the predetermined timing is set after the predetermined time from the start of the power supply, but such a case is not limiting. The predetermined timing may be, for example, when the temperature detected by the temperature sensor 24 of the battery heater device 11 reaches a predetermined temperature (for example, 10 degrees) (that is, when the temperature sensor 24 detects a temperature equal to or higher than the predetermined temperature). In the Embodiment, the power supplied to the inner heater wire 33 is reduced from 100% to 50%, but not limited thereto, it may be reduced to a different rate (including 0%) depending on conditions such as arrangement of the vehicle or the battery module 10, for example.

Then, when the vehicle is switched on, the controller 22 stops the power supply to the outer heater wire 32 and inner heater wire 33. When the vehicle is switched on means when the ignition switch of the vehicle is turned on, when the start switch of the vehicle is turned on, when the motor or engine of the vehicle is started, or the like. After the motor or engine of the vehicle, etc. is started by switching the vehicle on, the temperatures of the respective cells 13 of the battery 12 will increase, making it unnecessary to perform the heating with use of the outer heater wire 32 and inner heater wire 32. Therefore, stopping the power supply to the heater 23 in this way can suppress the waste of the power from the power source 21.

In the Embodiment, the power supply is stopped when the vehicle is switched on, but a timing of stopping the power supply is not limited thereto. For example, the power supply to the outer heater wire 32 and inner heater wire 33 may be stopped when the temperature detected by the temperature sensor 24 becomes equal to or higher than a predetermined temperature (for example, 70 degrees) (that is, when the temperature sensor 24 detects a temperature equal to or higher than the predetermined temperature). In high temperatures, the lithium batteries used as the cells 13 in the Embodiment may become unsafe and/or their performance may be deteriorated, and therefore the predetermined temperature at which the controller 22 stops the power supply is set to a temperature which does not lead to unsafe or deterioration of the lithium battery (that is, a temperature under which the battery 12 does not deteriorate, for example, 70 degrees). Such a setting can maintain the performance of the battery 12.

As described above, the battery heater device 11 of the Embodiment comprises the outer heater wire 32 which heats the cells 13*a* positioned at the outer side in the battery 12 and the inner heater wire 33 which heats the cells 13*b* positioned at the central part (inner side) in the battery 12, enabling the two wires 32 and 33 to be connected with each other in parallel. In such an arrangement, until the temperatures of the respective cells 13 of the battery 12 reach a preset temperature (for example, 10 degrees), that is, until a predetermined time (for example, 3 minutes) lapses from the start of the power supply, the power is supplied at 100% to the outer heater wire 32 and inner heater wire 33, respectively. Thereafter, the power supply to the inner heater wire 33 is reduced.

According to such a control, supplying the power to both the outer heater wire 32 and inner heater wire 33 until the predetermined time has elapsed after the start of the power supply can improve the quick-heating performance of the battery 12. Also, reducing the power supplied to the inner heater wire 33 at the predetermined timing after the start of the power supply can suppress a temperature rising of the cells 13b at the central portion which are not likely to be cooled, with being unaffected by the arrangement of the battery module or the vehicle. This can equalize the temperatures of the respective cells 13 of the battery 12, thereby avoiding uneven heating. That is, the quick-heating performance of the battery 12 can be improved and the battery 12 can be heated more uniformly with use of simple arrangement.

The present invention is not limited to the above-described embodiment, but is practicable in various forms. For example, in the embodiment, the first and second heater parts 32 and 33 are heater wires, but not limited thereto, they may be planar heating elements.

Also, in the embodiment, the power source 21 mounted on the vehicle supplies the power to the heater 23, but not limited thereto, the battery 12 itself may provide the power to the heater 23, for example.

Also, in the embodiment, the temperature sensor 24 is positioned on the heater 23, but not limited thereto, may be disposed on (the cells 13 of) the battery 12, for example. In addition, one temperature sensor 24 which detects its ambient temperature is provided, but such a case is not limiting. For example, it is possible to provide a temperature sensor which detects the temperature of the outer heater wire 32, or the temperatures of the cells 13a positioned at the outer side in the battery 12, or the like, and provide separately a temperature sensor which detects the temperature of the inner heater wire 33, or the temperatures of the cells 13b positioned at the inner side in the battery 12, or the like.

The battery heater device according to the present invention can improve the quick-heating performance of the battery under low-temperature condition, thus being applicable to vehicle-mounted applications.

Although the present invention has been fully described by way of preferred embodiments with reference to the accompanying drawings, it is to be noted here that various changes and modifications will be apparent to those skilled in the art. Therefore, unless such changes and modifications otherwise depart from the scope of the present invention as set forth in the appended claims, they should be construed as being included therein.

The contents of a specification, drawings and claims of a Japanese patent application No. 2012-174659 filed Aug. 7, 2012 are herein expressly incorporated by reference in their entirety.

The invention claimed is:

1. A battery heater device adapted to be connected to a power supply that supplies power to the battery heater device, the battery heater device being configured to heat a battery with a plurality of cells mounted on a vehicle, the battery heater comprising:
    a first heater part configured to heat cells positioned at an outer side in the battery;
    a second heater part positioned in an area defined by the first heater part, the second heater part is configured to heat cells positioned at an inner side in the battery; and
    a controller which controls power to be supplied to the first and second heater parts,
    wherein the controller reduces a power supplied to the second heater part, without reducing a power supplied to the first heater part, at a predetermined timing after start of the power supply to the first and second heater parts.

2. The battery heater device according to claim 1, wherein the controller starts the power supply to the first and second heater parts when the vehicle is switched off by a switch.

3. The battery heater device according to claim 1, further comprising a temperature sensor to detect a temperature of the battery, wherein the controller starts the power supply to the first and second heater parts when the temperature sensor detects a temperature of the battery which is equal to or lower than a predetermined temperature.

4. The battery heater device according to claim 1, wherein the controller stops the power supply to the first and second heater parts when the vehicle is switched on.

5. The battery heater device according to claim 1, further comprising a temperature sensor to detect a temperature of the battery,
wherein the controller stops the power supply to the first and second heater parts when the temperature sensor detects a temperature of the battery which is equal to or higher than a predetermined temperature.

6. The battery heater device according to claim 3, wherein the predetermined temperature is set to a temperature under which performance of the battery is not worsened.

7. The battery heater device according to claim 5, wherein the predetermined temperature is set to a temperature under which the battery does not deteriorate.

* * * * *